Oct. 25, 1927.

W. J. DONOVAN 1,646,953

MEANS AND METHOD FOR LOCATING VALVE PARTS IN RUBBER TUBES

Filed Sept. 4, 1925

INVENTOR.
William J. Donovan
BY
Edward C. Taylor
ATTORNEY.

Patented Oct. 25, 1927.

1,646,953

UNITED STATES PATENT OFFICE.

WILLIAM J. DONOVAN, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

MEANS AND METHOD FOR LOCATING VALVE PARTS IN RUBBER TUBES.

Application filed September 4, 1925. Serial No. 54,576.

This invention relates to the improvement of rubber tubes, such as the inner tubes which are used in automobile tire casings, and has particular reference to increasing the accuracy with which the valve parts may be located in these tubes. Particularly in the manufacture of tubes with bent valve stems for use on disc wheels, the problem of location is one of considerable difficulty. It is difficult for the bridge or spacing washer to be so located as to lie in the direction of the length of the tube, and for the bent end of the valve stem itself to be placed so that it is pointed at right angles to the tube. According to my invention these difficulties are done away with and the centering of the valve stem is made easy.

Referring to the drawings.

The tube is, according to my invention, vulcanized on a mandrel 10 which is of a usual type bent into the form of an incomplete annulus, the ends of the tube being slightly spaced apart to permit the tube being placed on or removed from the mandrel. At a point where the valve stem is to be located in the finished tube the mandrel is provided with a small stud 11, preferably with a substantially spherical head. The purpose of this stud will appear later. Passing through the center of the stud are lines 12 and 13 cut at right angles to each other into the surface of the mandrel.

Figure 1:
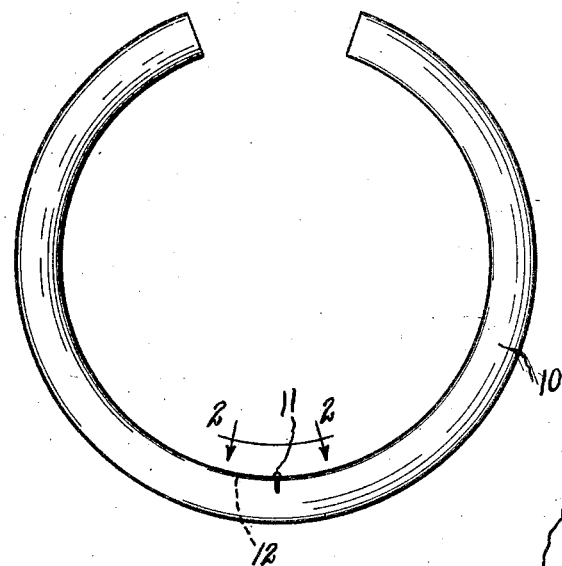
Fig. 1 is a side view of an annular mandrel made in accordance with my invention.
Figure 2:
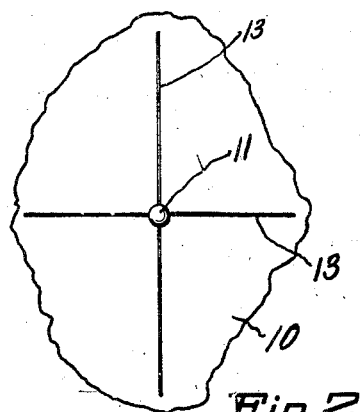
Fig. 2 is a detail of a portion of the inner face thereof.
Figure 3:
Fig. 3 is a section through a part of a tube made according to my process.
Figure 4:
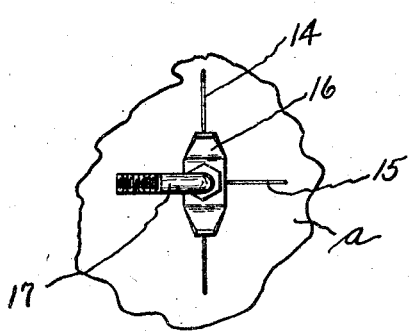
Fig. 4 is a partial view of the inner circumference of a tube using a bent valve stem.
Figure 5:
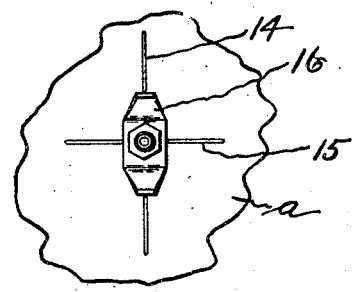
Fig. 5 is a similar view showing a tube using a straight valve stem.

When a tube $a$ is vulcanized on a mandrel constructed as described its surface will be marked as shown in plan in Fig. 2 and in section in Fig. 3. The raised lines 14 and 15, formed on the tube by the intersecting cuts 12 and 13, serve respectively as locating guides for the bridge washer 16 and the bent valve stem 17. If the washer and the valve stem are located by these lines they must of necessity be in the proper positions relatively to the tube, for the marks are formed on the tube in a definite relation at the time the tube is vulcanized. The stud 11 forms a depression 18 in the rubber of the tube which, when the tube is vulcanized and turned, as usual, inside out, serves to locate the place where the tube must be perforated in order to have the hole for the valve stem come in the center of the valve pad. This pad, of course, has been placed before vulcanization in a central position with respect to the stud and the lines cut into the mandrel.

Having thus described my invention, I claim:

1. The method of making a rubber tube which comprises molding onto the tube during vulcanization a marking indicating the axis of the tube, and locating the valve parts by such marking.

2. The method of making a rubber tube which comprises molding on the tube during vulcanization a pair of lines at right angles to each other, one extending circumferentially of the tube and parallel to its axis, and the other extending transversely of the tube, and locating the valve parts by such markings after the tube is vulcanized.

3. A mandrel for use in the vulcanization of rubber tubes upon the surface of which are formed a pair of molding lines at right angles to each other.

4. A mandrel for use in the vulcanization of rubber tubes upon the surface of which are formed a pair of molding lines at right angles to each other, and a stud projecting from the surface of the mandrel at the intersection of these lines substantially as and for the purpose described.

WILLIAM J. DONOVAN.